United States Patent [19]

Rasmussen

[11] Patent Number: 4,485,654
[45] Date of Patent: Dec. 4, 1984

[54] HYDRAULIC CHUCK FOR THREADED TUBE

[75] Inventor: Robert Rasmussen, Minneapolis, Minn.

[73] Assignee: Air-Mo Hydraulics Inc., Minneapolis, Minn.

[21] Appl. No.: 460,497

[22] Filed: Jan. 24, 1983

[51] Int. Cl.³ ............................................. B21D 39/08
[52] U.S. Cl. ............................................ 72/58; 279/4; 279/99; 285/355
[58] Field of Search ............................ 72/58, 61, 62; 29/421 R; 279/4, 99; 285/18, 355

[56] References Cited

U.S. PATENT DOCUMENTS

| 3,442,106 | 5/1969 | Gray et al. | 72/58 |
| 3,962,769 | 6/1976 | Smida | 279/4 X |
| 4,142,739 | 3/1979 | Billingsley | 285/18 |
| 4,393,674 | 7/1983 | Rasmussen | 29/421 R X |
| 4,432,559 | 2/1984 | Rasmussen | 279/4 |
| 4,432,569 | 2/1984 | Wietecha | 285/18 |

Primary Examiner—William R. Briggs
Assistant Examiner—Lawrence H. Meier
Attorney, Agent, or Firm—John S. Munday

[57] ABSTRACT

A threaded coupling chuck device for use with a female threaded tube, including a chuck body, adaptor means, probe means, seal means, and port means.

The body has an axis of rotation and shaft means for rotation, centered about said axis. Adaptor means are mounted on the body and have a threaded portion for engagement with the threaded tube to form a threaded coupling upon rotation of the internal portion of said body in a first direction about said axis. Probe means are slideably mounted in contact with the adaptor means and are positioned to align the respective threaded portions of said adaptor and said tube.

Seal means are included, and are positioned to prevent passage of fluid through the coupling. The seal includes a threaded annular portion of the adaptor means, which portion is adapted to expand into contact with the tube upon activation. The seal means includes piston means positioned to glide along the axis from a first position to a second position where the seal is activated. The adaptor means includes a plurality of pins parallel to the axis and positioned to contact the seal at one end to thereby expand the threaded portion of the seal. The probe has a shoulder means positioned to contact the pins upon movement of the piston to the second position.

Port means are provided to define a passage through the body, including an inlet for connecting to a source of fluid and in outlet through the adaptor means to the interior of the tube.

9 Claims, 1 Drawing Figure

HYDRAULIC CHUCK FOR THREADED TUBE

BACKGROUND OF THE INVENTION

Fluid pressure operated devices for radially expanding portions of tubing are known, such devices being disclosed in U.S. Pat. Nos. 1,448,457; 2,479,702; 2,938,562; and 3,200,627. Structures of these patents include fluid conveying mandrels receivable within the tubes, means for expansing the mandrels to hold the tubing, and die elements against which portions of the tubes are flared or otherwise formed by fluid pressure. These expanding devices are customarily used to provide shaped bulges in tubing for coupling purposes and the like. In addition, they are used to expand tubing to fit fins and other apparatus connected to the outer surface of the tubing, or to apply hydrostatic test fluids to the apparatus.

Several hydraulic chucks have been developed which are suitable for tightly gripping one end of the elongated tube while simultaneously delivering a tube expanding or testing fluid. Among these are U.S. Pat. Nos. 3,505,846; 3,813,751; 3,962,769; and 4,189,162.

One of the problems which has plagued users of hydraulic chucks is the inability of such previously described chucks to fasten operably to the ends of the tubes without damaging the tube, particularly where the tube end is threaded for connection to other equipment. Threaded tubes are particularly susceptable to damage, which then involves costly repair.

One method which obviates damage to the threads is to design the chuck so that it can be threaded into the tube. Because several revolutions of the chuck are required, it is often times necessary to disconnect the chuck from pneumatic or hydraulic sources. More important, seals must be provided which can withstand the high hydraulic pressure which is applied to the tube through the chuck.

Hydraulic chucks should be designed to be used with a vast multitude of tubes, and should not require repair or servicing for long periods of time. Yet often times the seals which may be provided often times are damaged by contact with the tube or tube threads, or the seals wear out from use. It is expected that seals will, in time, need replacement. Replacement should not be a major engineering effort, nor should it be necessary to worry about seal alignment or wear during installation.

Accordingly, it would be of great advantage if a hydraulic chuck could be provided which would easily connect to threaded tubes, and particularly female threaded tubes, and which would permit quick and damage free connection to the tube. The device must be capable of mounting or connecting on the tube without constant disconnection of the hydraulic or pneumatic lines. Damage to the tube, and to the chuck and chuck seals should be minimal at most.

SUMMARY OF THE INVENTION

The present invention relates to a hydraulic chuck, comprising a plurality of parts in interworking relationship which accomplish the objects of the present invention. Specifically, the invention comprises a hydraulic chuck for use with a female threaded tube.

The chuck includes a chuck body which is centered about an axis of rotation, and includes a shaft centered on that axis. An adaptor means is rotably mounted in the body, and has a threaded portion sized for engagement with the tube threads to form a threaded coupling.

Seal means are provided on said adaptor and are positioned to prevent passage of fluid through the coupling. Means to activate and deactivate the seal are provided.

Porting means are also included, which define a passage through the body. The porting means include an inlet for connection to a source of fluid or hydraulic pressure. An outlet is provided through the adaptor to the interior of the tube.

In a preferred embodiment there is a probe means for positioning the adaptor in the tube to align the respective threaded portions of the tube and adaptor. The means to activate the seal means includes a piston means positioned to slide along said axis in the body from a first position to a second position to activate the seal.

A preferred seal includes a threaded annular portion positioned along the threaded portion of the adaptor means, such that the portion is adapted to expand into contact with the tube when said piston is in said second position. Pneumatic means may be provided to move said piston between the positions.

In one embodiment a sleeve is positioned on said probe to operably contact the seal means when the piston assembly is moved to the second position. The seal means has a plurality of pins positioned parallel to the axis and aligned to contact said sleeve at one end of the pin as it reaches the second position and contact the seal assembly at the other end of the pin to push on and thereby expand the threaded portion of the seal. Axial pins, integral with the elastomeric seal, maintain the threadedportion of said seal in alignment with the threaded adaptor.

A particularly preferred embodiment includes thrust bearing means which are mounted on the adaptor means, or the body, and are aligned to contact the end of the tube as it is rotated on to the adaptor. The thrust bearing permits movement of the adaptor with respect to the tube in either direction to connect or remove without frictional contact on the tube.

DESCRIPTION OF THE DRAWINGS

For a more complete understanding of the invention, reference is hereby made to the drawing, in which:

The FIGURE is a partially sectioned view showing one embodiment of the present invention.

DETAILED DESCRIPTION OF THE INVENTION

Figure 1:
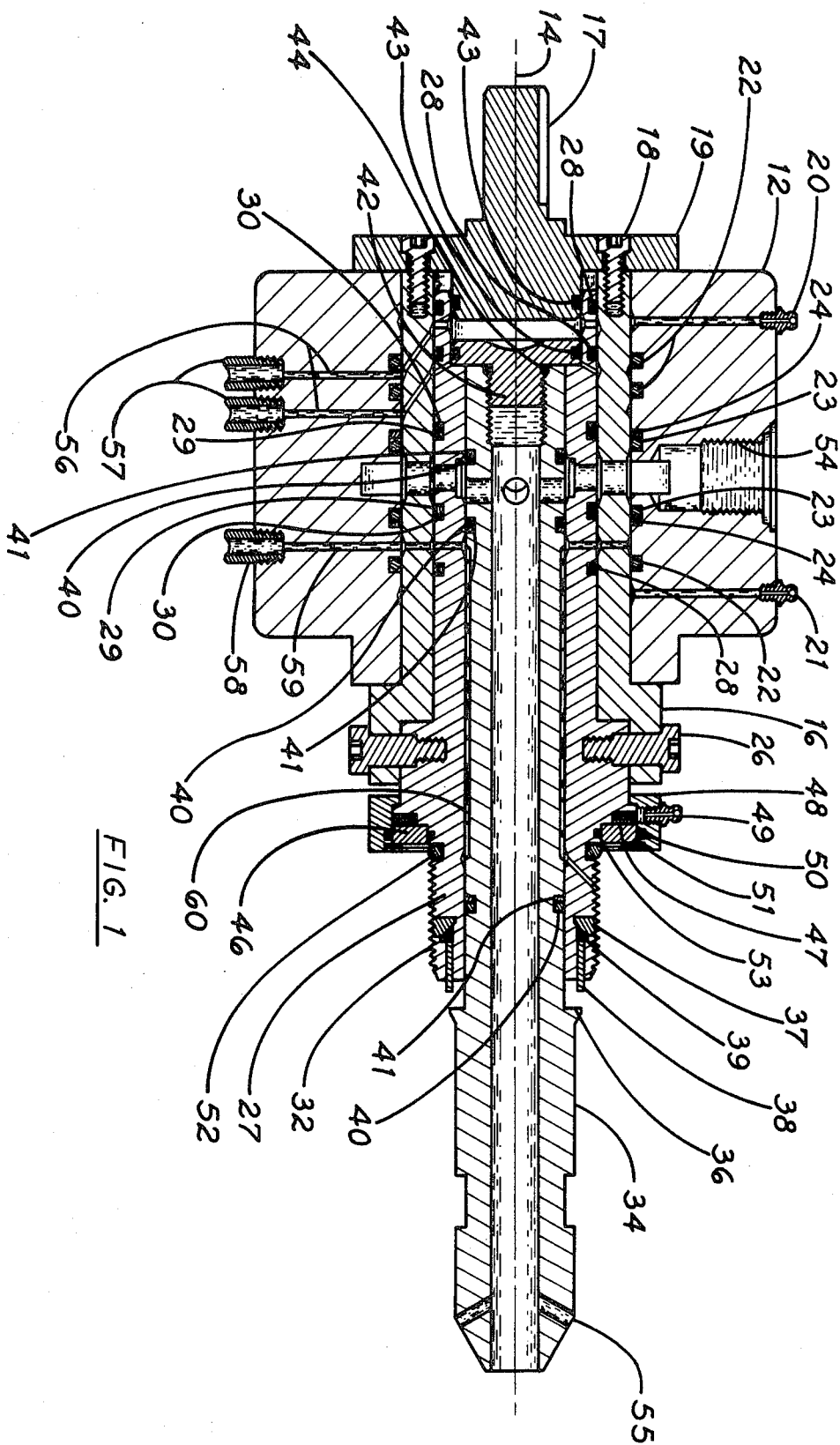

As shown in the FIGURE, the chuck 10 is generally described. The chuck includes a body 12 which is centered about on axis 14 of rotation and is mounted on sleeve 16. Shaft 17 is mounted on sleeve 16 via cap screws 18, while the cap portion 19 of the shaft 17 cooperates with the sleeve 16 to position the sleeve 16 within the body 12 and about the axis 14. Lube fittings 20 and 21 provide lubrication for rotation of sleeve 16 when shaft 17 is turned, with o-ring seals 22 and 23 preventing loss of fluid. Backup rings 24 are provided near the port means described hereinafter.

Mounted inside body 12 and fastened to sleeve 16 via shoulder bolts 26 is an adaptor 27, which turns along with shaft 17. O-ring seals 28 and 29 function to prevent loss of fluid, as does backup ring 30. Adaptor 27 is threaded with threads 32 which are sized to fit the female threads of a tube to be coupled to the chuck. Probe 34 is slideably fitted inside adaptor 27 to guide the threads 32 to the tube.

Shoulder 36 of probe 34 activates threaded seal 37 by moving pins 38 against seal expander 39. Pins 38 are parallel to axis 14. Movement of probe 34 with respect to expander 27 along axis 14 operates the seal means. O-ring seals 40 and backup rings 41 prevent unwanted passage of fluid.

Attached to probe 34 in the interior of body 12 is a piston means 42. O-ring seals 43 and 44 isolate the junction between the probe 34 and the adaptor 27 near the piston 42. Air or other fluid pressure can be applied to piston 42 via conduits 56 and connectors 57 to move the piston 42 axially along axis 14 to activate and inactivate seal 37.

As the shaft 17 is rotated to screw threads 32 of adaptor 27 into the pipe, the end of the pipe will contact thrust bearing retainer 46 of thrust bearing assembly 47, which is held in place by housing 48 and lube fitting 49. O-ring 50 and snap ring 51 complete the assembly. As an additional protection, o-rings 52 and 53 provide additional seal protection for the threaded coupling. Attached to body 12 is a port 54 which defins a passage through the check, through sleeve 16, adaptor 27 and probe 34 to permit the test fluid to enter the tube via port 34 at the right end 55.

In operation, the tube is brought into contact with the probe 34 which permits the threading 32 of adaptor 27 to form a threaded coupling. Rotation of shaft 17 in the proper direction causes the edge of the female threaded tube to contact thrust bearing retainer 46. In automated designs, a pressure sensitive switch could be activated by thrust bearing 47 to stop rotation of shaft 17.

Upon completion of the coupling at threads 32, air is passed to the right of piston 42, causing piston 42 and probe 34 to move (from right to left in the drawing) from a first position to a second position. As probe 34 moves to the second position, shoulder 36 contacts pins 38 and seal expander 39 to expand threaded seal 37 into the threaded coupling and prevent passage of fluid out that end of the tube. Optional o-rings 52 and also 53, further insure against leakage.

At this point the tube is pressurized by hydraulic pressure through port 54 as fluid travels from a source (not shown) to the tube and the right end 55 of probe 34. Seal leaks can be monitored by observation of leakage occuring in the annulus between adaptor 27 and probe 34, between o-rings 52 and seal 37 which is ported to the connector 58 on body 12 via conduits 59 and annulus 60 on probe 34. O-rings 43 and 44 prevent leakage of air out of either side of piston 42.

Once the test is completed, the system is depressurized through port 54 and the seals 37 is deactivated by pressurizing the left side of piston 42, moving shoulder 36 away from pins 38. Seal 37 can now contract in its grove. The motor driving shaft 17 is reversed and the chuck is unscrewed from the coupling. Thrust bearing 47 eliminates any binding of the tube against the chuck.

Having thus described the invention, what is claimed is:

1. A threaded coupling chuck device for use with a female threaded tube, comprising:
   a chuck body centered about an axis of rotation, and including a shaft means centered about said axis;
   an adaptor means rotatably mounted in said body and having a threaded portion for engagement with said threaded tube to form a threaded coupling upon rotation of said adaptor in a first direction about said axis;
   seal means on said adaptor and positioned to prevent passage of fluid through said coupling, and including means to activate said seal means; and
   port means defining a passage through said adaptor and said body, including an inlet on said body for connection to a source of fluid and including an outlet through said adaptor means to the interior of said tube.

2. The device of claim 1, which further includes probe means for positioning said adaptor means in said tube to align the respective threaded portions of said adaptor and said tube.

3. The device in claim 2, wherein said means to activate said seal means includes piston means positioned to slide along said axis in said body from a first position to a second position whereby said seal means is activated.

4. The device of claim 3 wherein said seal means includes a threaded annular portion positioned along the threaded portion of said adaptor means, which portion is adapted to expand into contact with said tube when said piston is in said second position.

5. The device of claim 4 which further includes pneumatic means for moving said piston selectively between said first position and said second position.

6. The device of claim 5 which further includes shoulder means on said probe and positioned to operably contact said seal means, said seal means having a plurality of pins parallel to said axis and positioned to contact said shoulder means at one end and contact said seal means at the other end to thereby expand said threaded portion of said seal.

7. The device of claim 1 wherein said body further includes thrust bearing means adapted to contact the end of said tube upon rotation of said adaptor in said first direction about said axis and is further adapted to permit movement of said adaptor in the other direction about said axis without restriction from contact by said end of said tube.

8. A threaded coupling chuck device for use with a female threaded tube, comprising:
   a chuck body having central axis and having a shaft centered about said axis;
   adaptor means rotatably mounted on said body and having a threaded portion for engagement with said threaded tube to form a threaded coupling upon rotation of said means in a first direction about said axis;
   probe means slideably contacting said adaptor means and positioned to align the respecting threaded portions of said adaptor and said tube;
   seal means positioned to prevent passage of fluid through said coupling and including a threaded annular portion positioned along the threaded portion of said adaptor means, which portion is adapted to expand into contact with said tube upon activation, said seal means including piston means positioned to slide along said axis in said body from a first position to a second position, said adaptor means having a plurality of pins parallel to said axis and positioned to contact said seal means at one end to thereby expand said threaded portion of said seal, and said probe having sleeve means positioned to contact said pins upon movement of said piston to said second position;
   second seal means engaging the end of said threaded tube, to prevent leakage from tube;
   thrust bearing means on said adaptor and positioned to contact the end of said tube upon rotation of said adaptor in said first direction and further being adapted to permit movement of said adaptor in the other direction about said axis without restriction from contact by said end of the tube; and port means defining a passage through said body, including an inlet for connection to a source of fluid and including an outlet through said adaptor means to the interior of said tube.

9. The device of claim 8 which further includes pneumatic means for moving said piston selectively between said first position and said second position.

* * * * *